| United States Patent [19] | [11] Patent Number: 4,893,187 |
| --- | --- |
| Tsujimoto et al. | [45] Date of Patent: Jan. 9, 1990 |

[54] IMAGE PROCESSING APPARATUS

[75] Inventors: Shuichi Tsujimoto; Haruo Asada, both of Yokohama, Japan

[73] Assignee: Kabushiki Kaisha Toshiba, Kawasaki, Japan

[21] Appl. No.: 205,774

[22] Filed: Jun. 13, 1988

[30] Foreign Application Priority Data

Sep. 30, 1987 [JP] Japan .................................. 62-246138

[51] Int. Cl.$^4$ ............................................ H04N 1/419
[52] U.S. Cl. .................................... 358/261.1; 358/432
[58] Field of Search ............... 358/261.1, 261.2, 261.3, 358/261.4, 262.1, 432

[56] References Cited

U.S. PATENT DOCUMENTS

| 4,257,069 | 3/1981 | Murayama | 358/261.2 |
| 4,571,634 | 2/1986 | Caneschi | 358/261.3 |
| 4,658,430 | 4/1987 | Anderson et al. | 382/46 |
| 4,757,552 | 7/1988 | Asano | 358/261.3 |

Primary Examiner—Edward L. Coles, Sr.
Assistant Examiner—Jerome Grant
Attorney, Agent, or Firm—Foley & Lardner, Schwartz, Jeffery, Schwaab, Mack, Blumenthal & Evans

[57] ABSTRACT

An image processing apparatus comprises an input image memory for storing input image data obtained by coding original image data with run length codes for a first direction, a reading circuit for sequentially reading from the input image memory the data of every two lines which are adjacent to each other in a second direction orthogonal to the first direction, an exclusive OR processing circuit for carrying out an exclusive OR operation on the data of the every two lines read by the reading circuit to detect second directional endpoint positions of the original image data without decoding the input image data into the original image data, and a second directional processing circuit for carrying out a predetermined image process for the second direction according to the first directional endpoint positions detected by the exclusive OR processing circuit.

15 Claims, 8 Drawing Sheets

| 1bit | 7bit |
|---|---|
| FLAG | RUN LENGTH |

0/1 (WHITE/BLACK)

| i→ | 1 | 2 | 3 | 4 | 5 | 6 | 7 | 8 | 9 | 10 |
|---|---|---|---|---|---|---|---|---|---|---|
|  | 1 | 2 | 3 | 3 | 3 | 2 | 3 | 2 | 1 | 1 |

J(i,k) ~12

| k↓ | 1 | 2 | 3 | 4 | 5 | 6 | 7 | 8 | 9 | 10 |
|---|---|---|---|---|---|---|---|---|---|---|
| 1 | 1 | 1 | 1 | 1 | 1 | 1 | 1 | 1 | 1 | 1 |
| 2 |   | 2 | 2 | 2 | 2 |   | 2 | 2 |   |   |
| 3 |   |   |   | 3 | 3 | 3 | 3 |   |   |   |
| 4 |   |   | 4 |   |   |   |   |   |   |   |

FIG.7

| i→ | 1 | 2 | 3 | 4 | 5 | 6 | 7 | 8 | 9 | 10 |
|---|---|---|---|---|---|---|---|---|---|---|
| | 0a | 01 | 01 | 01 | 01 | 82 | 01 | 01 | 08 | 0a |
| |    | 88 | 82 | 81 | 81 | 06 | 81 | 89 | 82 |    |
| |    | 01 | 05 | 06 | 06 | 81 | 05 |    |    |    |
| |    |    | 81 | 81 | 81 | 01 | 83 |    |    |    |
| |    |    | 01 | 01 | 01 |    |    |    |    |    |

| k | | i→ | 1 | 2 | 3 | 4 | 5 | 6 | 7 | 8 | 9 | 10 |
|---|---|---|---|---|---|---|---|---|---|---|---|---|
| 1 | Proj(i) | | 0 | 0 | 0 | 0 | 0 | 0 | 0 | 0 | 0 | 0 |
|   | Prev(i) | | 0 | 0 | 0 | 0 | 0 | 1 | 0 | 0 | 0 | 0 |
| 2 | Proj(i) | | 0 | 0 | 0 | 0 | 0 | 0 | 0 | 0 | 0 | 0 |
|   | Prev(i) | | 0 | 2 | 2 | 2 | 2 | 1 | 2 | 2 | 0 | 0 |
| 3 | Proj(i) | | 0 | 0 | 0 | 1 | 1 | 2 | 1 | 0 | 0 | 0 |
|   | Prev(i) | | 0 | 2 | 2 | 0 | 0 | 0 | 0 | 2 | 0 | 0 |
| 4 | Proj(i) | | 0 | 0 | 2 | 1 | 1 | 2 | 1 | 0 | 0 | 0 |
|   | Prev(i) | | 0 | 2 | 0 | 0 | 0 | 0 | 0 | 2 | 0 | 0 |

Run (m,n)

IMAGE PROCESSING APPARATUS

BACKGROUND OF THE INVENTION

1. Field of the Invention

The present invention relates to an image processing apparatus for carrying out image processes such as a horizontal-to-vertical converting operation to convert an input image represented with first directional run length codes into an image represented with second directional run length codes.

2. Description of the Prior Art

A run length coding method is widely used in various image processing apparatuses such as facsimiles to compress image data. According to the run length coding method, an original image is subjected to a raster scanning operation to obtain binary image data. The binary image data are used to make a bit map, each line of the bit map comprising black dots and white dots. The length (run length) of a series of consecutive black dots (hereinafter referred to as a "black run") and the length of a series of consecutive white dots (hereinafter referred to as a "white run"), as well as positional information of endpoints of the black and white runs are coded with run length codes.

In a simple run length coding method, each run length code comprises, for instance, eight bits. A first bit of the eight-bit code is a flag for indicating whether a run is white (0) or black (1), and the remaining bits of the code indicating the length of the run. Supposing a data comprises two consecutive white dots, three consecutive black dots and two consecutive white dots, the data will be coded as "02, 83, 02" in hexadecimal notation.

Meanwhile, horizontal and vertical run length data are frequently used to extract linear elements from an input image or to remove noises from the input image. For instance, in a handwritten character recognition apparatus, horizontal and vertical black runs are used as information to find horizontal and vertical projections.

The run length coding is generally carried out for the same direction as that of raster scan which takes place, for instance in a horizontal direction. Therefore, to obtain information of vertical components, coded horizontal run data are decoded into an original bit map (binary image data), and based on which vertical run length codes shall be prepared to obtain vertical projections, etc. Due to this, an image memory needed for the method must have a large capacity. Further, the process to obtain vertical components shall be carried out for every pixel so that the number of memory accesses and the number of computation may be increased to extend an operation time.

As described in the above, the conventional image processing apparatus requires a large memory capacity and takes a long time in carrying out an image process such as the horizontal-to-vertical converting operation to obtain run length codes for a direction different from a scanning direction.

SUMMARY OF THE INVENTION

An object of the present invention is to provide an image processing apparatus which can obtain run length codes for a direction different from a scanning direction at a high speed and with a small memory capacity.

Another object of the present invention is to provide an image processing apparatus which codes original image data with run length codes for a first direction to obtain input image data and, without decoding the input image data into the original image data again, processes the input image data as they are to detect endpoint positions for a second direction.

In order to accomplish the objects and advantages mentioned in the above, according to one aspect of the present invention, there is provided an image processing apparatus which encodes an original image with run length codes for a first direction to obtain input image data and carries out an exclusive OR operation on the data of adjacent two lines of the input image data to detect endpoints for a second direction which is different from the first direction. The apparatus comprises an input image memory for storing the input image data obtained by coding the original image data with the run length codes for the first direction, a reading circuit for sequentially reading from the input image memory the inputted image data of the two lines which are adjacent to each other in the second direction orthogonal to the first direction, an exclusive OR processing circuit for carrying out an exclusive OR operation on the input image data of the adjacent two lines sequentially read by the reading device without decoding the data into the original image data to detect endpoint positions for the second direction of the original image data, and a second directional processing circuit for carrying out a predetermined image process for the second direction according to the endpoint positions for the second direction detected by the exclusive OR processing circuit.

In adjacent two lines of the input image data coded with the run length codes for the first direction, if both the lines have the same run length codes, it means that there is no endpoints for the second direction in the lines. If the run length codes of the two lines are different from each other, it means that there are endpoints for the second direction at positions where the run length codes are different from each other.

In the apparatus according to the present invention, the data of adjacent two lines of the input image data are subjected to the exclusive OR operation to extract positions where the run length codes are different from each other to detect endpoint positions for the second direction. Once the endpoint positions for the second direction are detected, an image process for the second direction may be easily performed.

As described in the above, according to the apparatus of the present invention, the input image data coded with run length codes are not decoded into the original image data but processed as they are to detect the endpoint positions for the second direction, thereby realizing a high-speed process with a small memory capacity.

These and other objects, features and advantages of the present invention will become apparent from the following descriptions of preferred embodiments taken in conjunction with the accompanying drawings.

BRIEF DESCRIPTION OF THE DRAWINGS

FIG. 4 is a block diagram showing the details of an exclusive OR processing circuit of the apparatus shown in FIG. 1;

FIG. 6 is a view for explaining a vertical run length coding process carried out in the apparatus shown in FIG. 1;

FIG. 7 is a view showing vertical runs obtained according to the process shown in FIG. 6;

DETAILED DESCRIPTION OF THE PREFERRED EMBODIMENTS

FIGS. 1 to 7 are views for explaining a horizontal-to-vertical conversion processing apparatus according to an embodiment of the present invention. The apparatus is for converting horizontal runs (runs in a first direction) into vertical runs (runs in a second direction).

Figure 1:
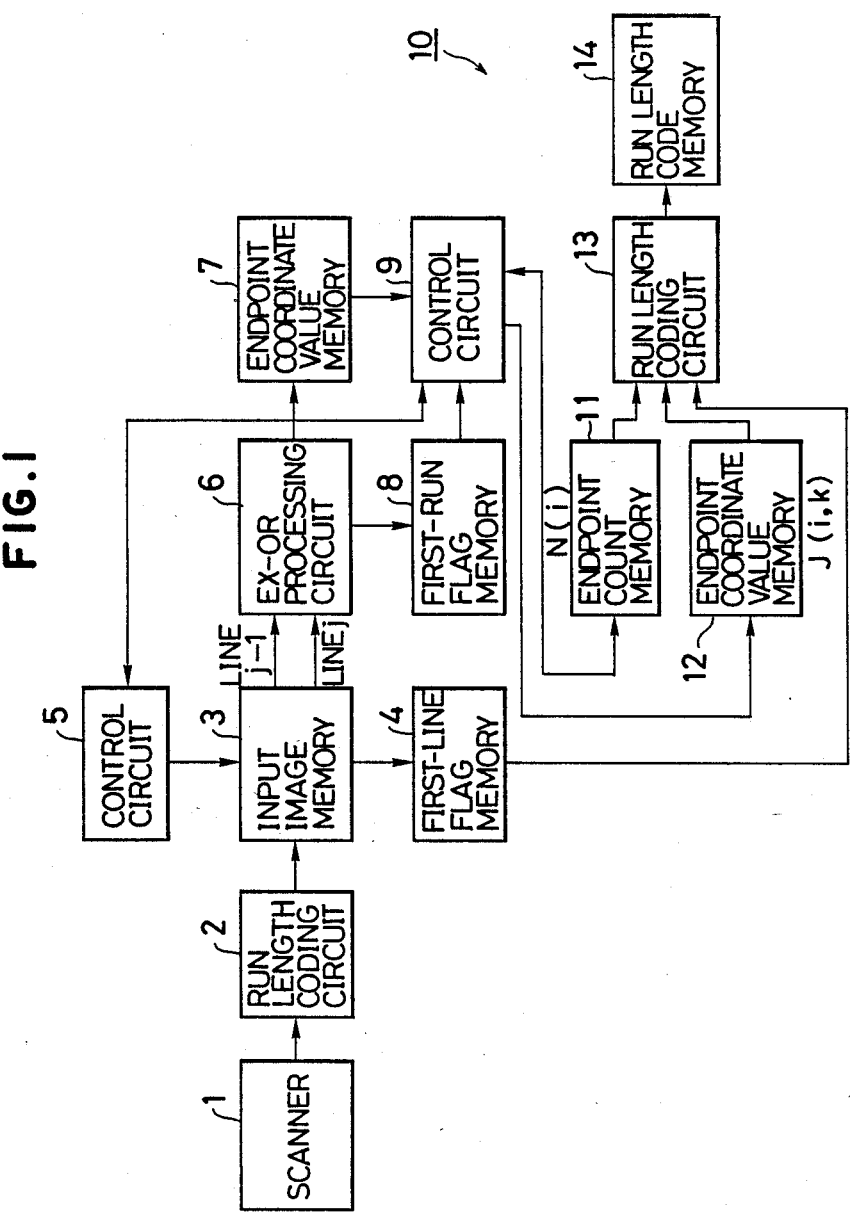
FIG. 1 is a block diagram showing the constitution of a horizontal-to-vertical conversion processing apparatus according to an embodiment of the present invention.

FIG. 1 is a block diagram showing the constitution of the apparatus. A scanner 1 carries out a raster scanning operation on an original image to output binary image data as original image data. A run length coding circuit 2 sequentially encodes the binary image data with run length codes to provide horizontal run length data which are outputted as input image data to an input image memory 3. The input image memory 3 stores the input image data transferred from the run length coding circuit 2. A first-line flag memory 4 is a register for storing flags only in the first line data among the input image data stored in the input image memory 3. A control circuit 5 specifies a read address with respect to the input image memory 3 to read the data of adjacent two lines, i.e., a line "j−1" and a line "j" from the input image memory 3.

The data of the lines j−1 and j sequentially read out of the input image memory 3 under the control of the control circuit 5 are given to an exclusive logical add processing circuit (hereinafter referred to as the "EX-OR processing circuit") 6. The EX-OR processing circuit 6 carries out an exclusive OR operation on the data of the lines j−1 and j to detect endpoint coordinate values for a vertical direction. An endpoint coordinate value memory 7 stores the endpoint coordinate values detected in the EX-OR processing circuit 6. A first-run flag memory 8 is a register for storing flags of first runs of respective lines detected in the EX-OR processing circuit 6.

A control circuit 9 properly reads data of the endpoint coordinate value memory 7 and of the first-run flag memory 8 to provide the read data to a vertical run conversion processing circuit 10 which is the second directional processing means, and gives a read timing to the control circuit 5 to read the input image memory 3.

The vertical run conversion processing circuit 10 comprises an endpoint count memory 11, an endpoint coordinate value memory 12, a run length coding circuit 13 and a run length code memory 14. The endpoint count memory 11 stores the numbers of endpoints for a vertical direction in each column of the input image data. The endpoint coordinate value memory 12 is a memory for storing coordinate values of the vertical endpoints of each column. The run length coding circuit 13 receives the numbers of endpoints of the respective columns from the endpoint count memory 11, the endpoint coordinate values of the respective columns from the endpoint coordinate value memory 12 and the flags of respective runs in the first line from the first-line flag memory 4 to carry out the vertical run length coding operation. The run length code memory 14 is a memory for storing the vertical run length codes prepared in the run length coding circuit 13.

An operation of the horizontal-to-vertical conversion processing apparatus with the above-mentioned arrangement will be described.

Figures 2, 3:
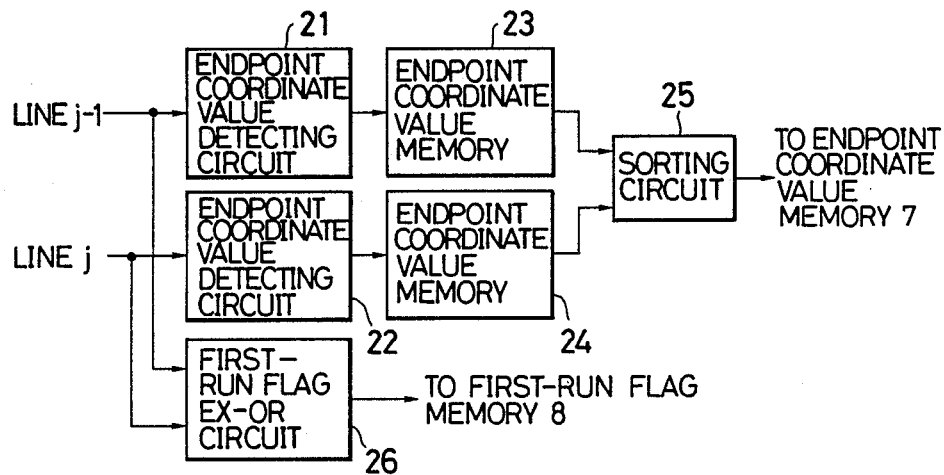
FIG. 2 is a view showing the structure of a run length code.
FIG. 3 is a view showing a run length coding process.

Original image data read by the scanner 1 are encoded with run length codes for the horizontal direction in the run length coding circuit 2. Each run length code comprises, for instance, one byte (eight bits) as shown in FIG. 2. A first bit of the code is a flag for identifying that a run is white (0) or black (1). The following 7 bits indicate the length of the run. In the run length coding circuit 2, lines j−1, j and j+1 of the original image data shown in FIG. 3 are coded with run length codes as indicated with hexadecimal numerals in the right side of the figure. These run length codes are stored for each line in the input image memory 3.

From the input image memory 3, the input image data for adjacent two lines are sequentially read and transferred to the EX-OR processing circuit 6 for an endpoint detection process.

FIG. 4 is a view showing an example of the constitution of the EX-OR processing circuit 6. The run length codes for the lines j−1 and j are given to endpoint coordinate value detecting circuits 21 and 22 respectively to find endpoint coordinate values for the horizontal direction. The horizontal endpoint coordinate values of the respective lines thus found are stored in endpoint coordinate value memories 23 and 24. The endpoint coordinate values stored in the memories 23 and 24 are given to and sorted in a sorting circuit 25.

When the memories 23 and 24 provide the same endpoint coordinate values to the sorting circuit 25, the sorting circuit 25 abandons the values and, when the memories 23 and 24 provide different values, the circuit 25 sorts the values. The sorting process is carried out from j=2 up to j=jmax.

Figure 5:
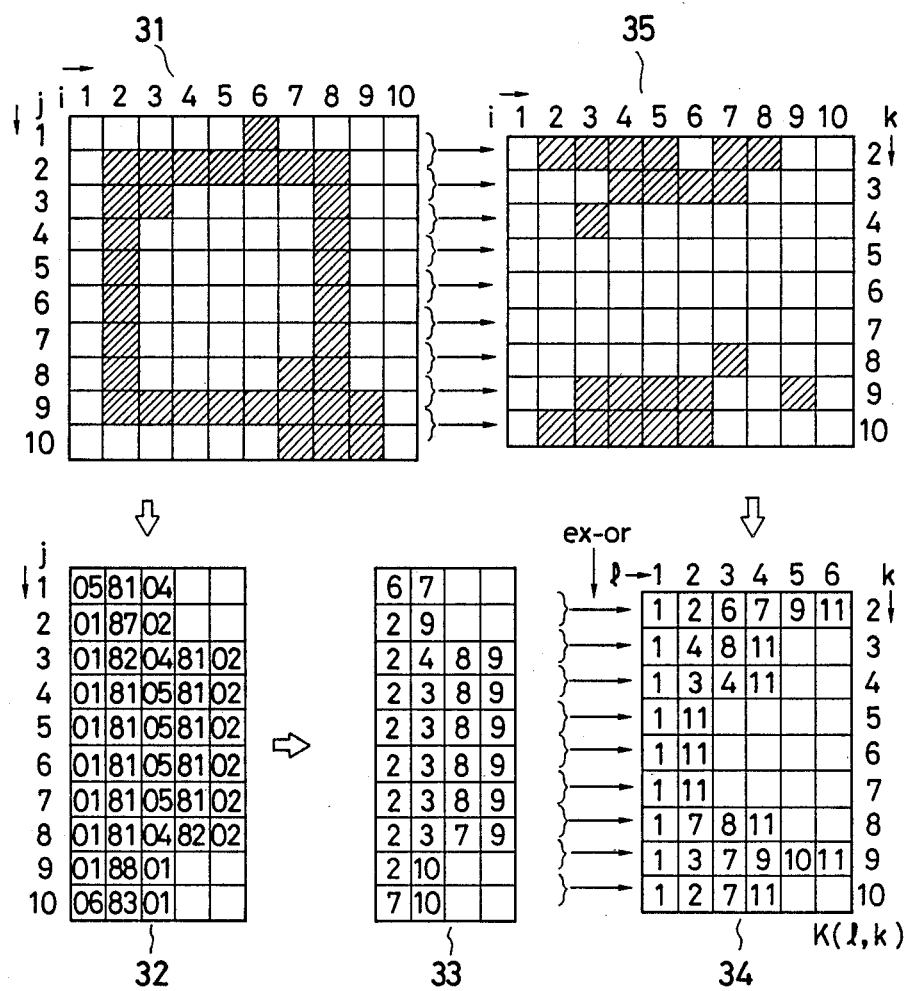
FIG. 5 is a view for explaining processes carried out in the circuit shown in FIG. 4.

FIG. 5 shows various processing states of image data. Based on original image data 31, there are obtained input image data 32 represented with run length codes for the horizontal direction. The run length codes are converted into horizontal coordinate values (i) to obtain data 33. Only different values in adjacent two lines among the data 33 are arranged in an ascending order, and a line head number "1" is added to the head of the arranged line while a line tail number plus one, i.e., "11" is added tail of the arranged line to obtain output data 34. The output data 34 are stored in the endpoint coordinate value memory 7.

The output data 34 may correspond to image data 35 shown in FIG. 5. Comparing the image data 35 with the original image data 31, it will be seen that the image data 35 have bits at changing points where dots change from white to black or from black to white. Namely, the image data 35 indicate endpoint positions for the vertical direction.

A first-run flag EX-OR circuit 26 shown in FIG. 4 extracts first-run flags of the lines J−1 and j to carry out the exclusive OR operation on the extracted flags and output the results to the first-run flag memory 8.

Referring to FIGS. 6 and 7, a vertical run length coding process will be described.

The endpoint count memory 11 is a one-dimensional memory corresponding to one line of the original image data. The contents of the memory 11 are represented with N(i). The endpoint coordinate value memory 12 is a two-dimensional memory having a capacity of storing vertical endpoints for every line of the original image data. The contents of the memory 12 are represented with J(i, k). The endpoint coordinate value memory 7 shown in FIG. 1 is a one-dimensional memory of which contents are represented with K(l, k) where "k" indicates a current processing point.

As initial values of the endpoint count memory 11, 1s are set in the N(i) (i=1 to imax). Also, as initial values of the endpoint coordinate value memory 12, is are set in the J(i, 1) (i=1 to imax). When k=2 is set, the control circuit 9 reads a flag of the line k from the first-run flag memory 8. If the flag is 1, end point coordinate values are read out of the endpoint coordinate value memory 7 in the order of:

$$\{K(1, k), K(2, k)\}, \{K(3, k)\}, K(4, k)\}, \ldots,$$

and if the flag is 0, the end point coordinate values are read out of the endpoint coordinate value memory 7 in the order of:

$$\{K(2, k), K(3, k)\}, \{K(4, k), K(5, k)\}, \ldots$$

Supposing $\{K(2, 2), K(3, 2)\}=(2, 6)$ shown in FIG. 5 have been read, the data N(i) for "1"s (2, 3, 4 and 5) satisfying $K(2, 2) \leq i \, K(3, 2)$ are read from the endpoint count memory 11, and the read data N(i) are incremented and stored again. At the same time, the line number k (=2) is registered in corresponding J(i, k), i.e., J(2, 2) to J(5, 2).

FIG. 6 is a view showing a state that the above-mentioned operation has been carried out up to k=4 for the data shown in FIG. 5.

The above-mentioned operation is repeated up to k=kmax (=10) to increment the data N(i) for all "i"s satisfying $1 \leq 1 \leq$ imax, and a value of kmax +1 is registered in J(i, N(i)). Accordingly, the numbers of vertical endpoints are registered in the endpoint count memory 11 while all the vertical endpoint coordinate values are registered in the endpoint coordinate value memory 12.

The run length coding circuit 13 refers to the first flag data stored in the first-line flag memory 4 and the endpoint coordinate value data in the endpoint coordinate value memory 12 to provide vertical run length codes. As a result, vertical run length codes as shown in FIG. 7 are obtained and stored in the run length code memory 14.

Although the endpoint coordinate values J(i, k) have been registered for each storage of the data of one line in the endpoint coordinate value memory 7 and, after the storage, the control circuit 9 requested the control circuit 5 to read the next data, the coordinate values of all lines may be stored in the endpoint coordinate value memory 7 before starting the vertical run converting process. Further, it is possible to perform the vertical run length coding operation for every registering operation into the endpoint coordinate value memory 12.

Figure 8:
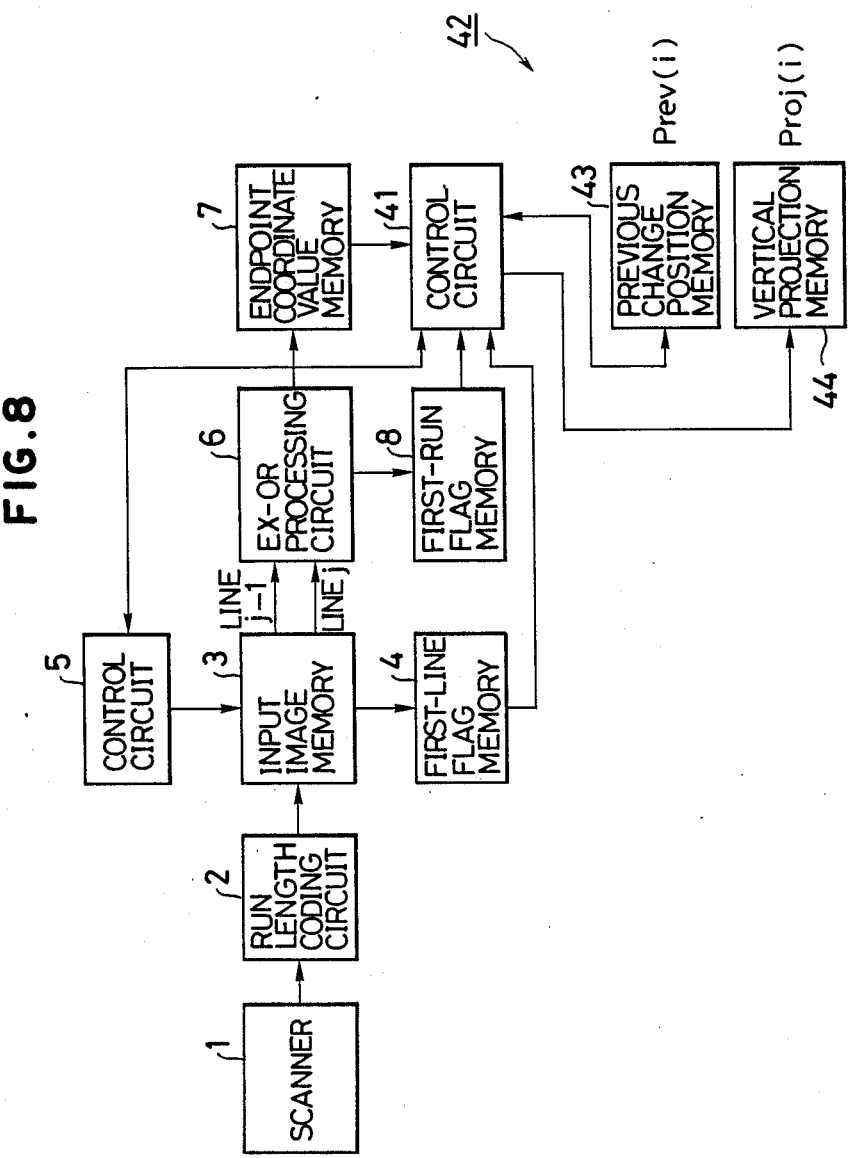
FIG. 8 is a block diagram showing the general constitution of a vertical projection detecting apparatus according to another embodiment of the present invention.
Figures 9, 10:
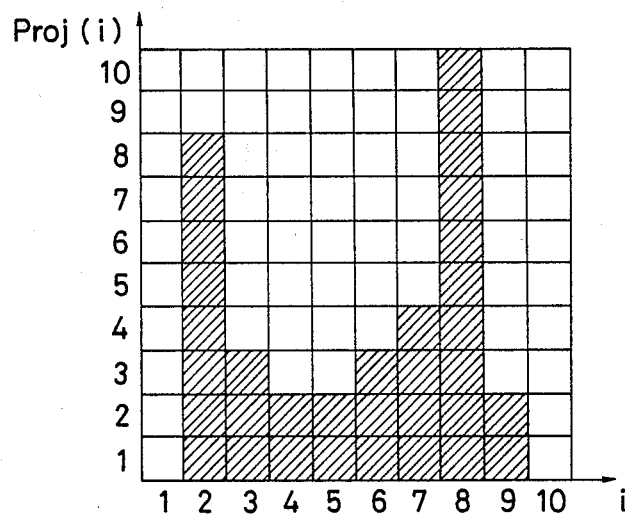
FIG. 9 is a view for explaining a projection detecting process carried out in the apparatus shown in FIG. 8.
FIG. 10 is a view diagrammatically showing vertical projections obtained according to the process shown in FIG. 9.

FIGS. 8 to 10 are views showing a vertical projection detector according to another embodiment of the present invention.

As shown in FIG. 8, a vertical projection detecting circuit 42 which is used as the second directional processing means comprises a previous change position memory 43 and a vertical projection memory 44. The previous change position memory 43 and the vertical projection memory 44 are one-dimensional memories respectively each having a capacity of storing one line of original image data. The contents of the memories 43 and 44 are represented with Prev(i) and Proj(i) respectively.

Flags of a first line in the first-line flag memory 4 are checked, and "i"s of the Prev(i) of the previous change position memory 43 are initially filled with 1s (the "1" representing the first line) for black runs and with 0s for white runs. The Proj(i) (i=1 to imax) of the vertical projection memory 44 are initially filled with 0s. A control circuit 41 reads the endpoint coordinate value memory 7 according to the value of a flag of a first run as in the case of the previous embodiment.

Supposing endpoint coordinate values K (l 1, k1) and K (l22, K1) have been read, the data 'Prev(i) for all "i"s satisfying $K(l\,1, k1) \leq = i < K(l\,2, k1)$ are read from the previous change position memory 43. For the "i"s satisfying Prev(i)>0 among the read data, vertical run lengths "k1-Prev(i)" are added to the Proj(i) stored in the vertical projection memory 44, and the data Prev(i) for the above-mentioned "i"s are reset to 0s. For "i"s satisfying "Prev(i)=0", the values of Prev(i) are changed to k. Namely, if a value Prev(i) is positive, it means that a vertical run in the line in question has been changed from black to white, and the positive value indicates a position where a previous change from white to back has occurred. The Proj(i) indicates the projection value of a column "i".

FIG. 9 is a view showing that the above-mentioned process has been carried out for the data shown in FIG. 5 up to k=4. When k=1, the Prev(i) and Proj(i) are set with initial values. When k=2, the Prev(i) for i=2 to 5, 7 and 8 are 0s respectively so that these Prev(i) are filled with k=2. When k=3, the Prev(i) for i=4 to 7 are larger than 0 so that the Proj(i) corresponding to these "i"s are added with values of k(=3)−Prev(i) respectively. After carrying out the above-mentioned operation up to k=kmax, Prev(i) are read and, for all "i"s satisfying Prev(i) >0, kmax +1−Prev(i) are added to the Proj(i) to complete the operation. As a result, the vertical projection memory 44 stores vertical projection data of the original image as shown in FIG. 10.

Although the previous change position memory 43 has stored the starting point coordinate values of vertical black runs, it is possible to obtain the vertical projection by subtracting change position coordinate values from the vertical projection memory Proj(i) when the vertical run changes from white to black, and by adding change position coordinate values to the Proj(i) when the vertical run changes from black to white.

Figure 11:
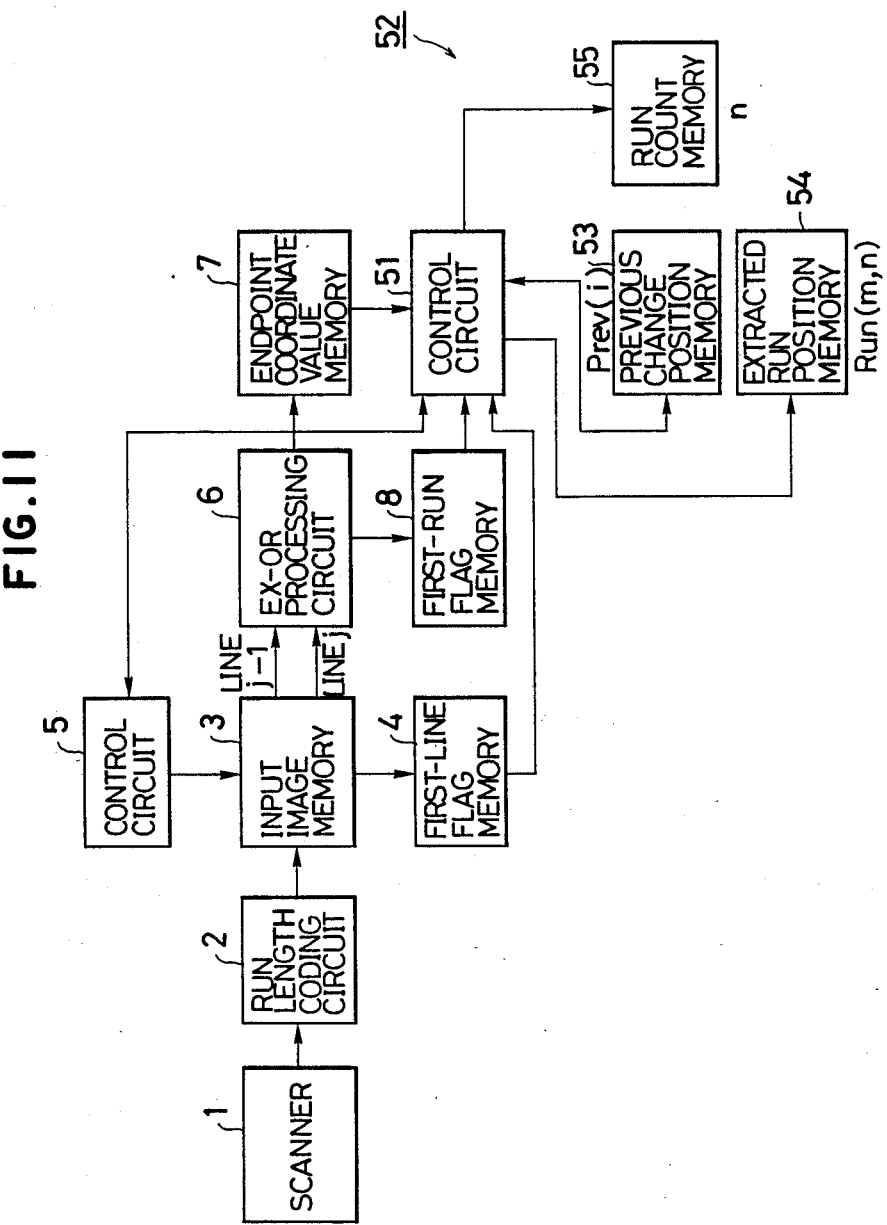
FIG. 11 is a block diagram showing the general constitution of a vertical component extracting apparatus according to still another embodiment of the present invention.
Figure 12:
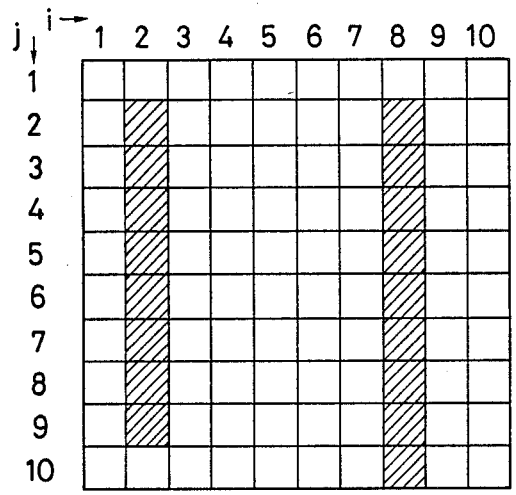
FIG. 12 is a view showing vertical runs extracted with the apparatus shown in FIG. 11.
Figure 13:
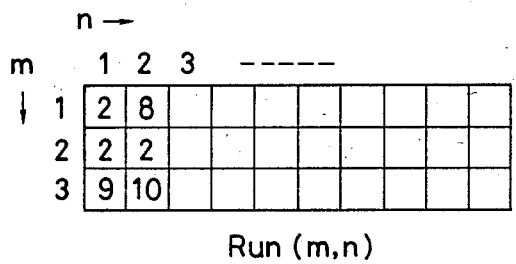
FIG. 13 is a view showing the contents of an extracted run position memory.

FIGS. 11 to 13 are views showing a vertical component extracting apparatus according to still another embodiment of the present invention.

As shown in FIG. 11, a vertical component extracting circuit 52 which is used as the second directional processing means comprises a previous change position memory 53, an extracted run position memory 54 and a run count memory 55. The previous change position memory 53 is a memory having the same function as that of the previous change position memory 43. The extracted run position memory 54 is a two-dimensional memory having a capacity of storing extracted runs for three lines. The contents of the memory 54 are represented with Run(m, n). The run count memory 55 is a memory for storing the number "n" of runs to be extracted and has an initial value of 0.

Similar to the previous embodiment, the contents Prev(i) of the previous change position memory 53 are initialized. A control circuit 41 reads the endpoint coordinate value memory 7 according to the value of a flag of a first run. Supposing endpoint coordinate values K(l1, k1) and K(l2, k1) have been read, the data Prev(i) for "i"s satisfying K(l1, K1)≦i<K(l 2, k1) are read from the previous change position memory 53. Among the read data, runs with "i"s ng K1−Prev(i)>th ("th"indicating a predetermined run length threshold) are registered as extracted runs, this registration is carried out by reading "n" from the run count memory 55, by incrementing the value, and by registering a column number "i" into a Run(1, n) of the extracted run position memory 54, Prev(i) into a Run(2, n) and k−1 into a Run(3, n). As a result, a column number "i" of the extracted run is registered into the Run(1, n), a starting point line position of the extracted run into the Run(2, n), and an endpoint line position of the extracted run into the Run(3, n). After the completion of the registration, the values of Prev(i) with respect to the "i"s satisfying the above-mentioned condition are reset to 0s. For "i"s satisfying Prev(i)=0, the values of Prev(i) are changed to k.

When the above-mentioned process is carried out for all endpoint coordinate values stored in the endpoint coordinate memory 7, the control circuit 51 informs the completion to the control circuit 5 to instruct the circuit 5 to read run length codes of the next line. This is repeated sequentially up to k=kmax. In the last, Prev(i) are read and, for all "i"s satisfying kmax+1−Prev(i)>th among "i"s satisfying Prev(i)>0, the line count memory 55 is read and incremented while a column number "i" is registered into a Run(1, n), a Prev(i) into a Run(2, n) and the kmax into a Run(3, n) to complete the operation. As a result, vertical runs having run lengths longer than the predetermined run length are extracted as shown in FIG. 12. The contents of the extracted run position memory 54 are as shown in FIG. 13.

According to this embodiment, by setting a value of the threshold "th" properly, an effect such as a noise removing effect will be realized.

In summary, according to the present invention, run length codes for a first direction are subjected to an exclusive OR operation to find endpoint coordinate values for a second direction which is different from the first direction. According to the endpoint coordinate values, an optional image process is carried out for the second direction so that a high-speed image processing is realized with a small capacity memory.

Various modifications will become possible for those skilled in the art after receiving the teachings of the present disclosure without departing from the scope thereof.

What is claimed is:

1. An image processing apparatus for carrying out a run length coding in a first direction on original image data to obtain input image data and carrying out an image process in a second direction on the obtained input image data, comprising:
   (a) memory means for storing obtained by carrying out the run length coding in the first direction on the original image data;
   (b) reading means for sequentially reading, from said memory means, data of every two lines which are adjacent to each other in the second direction; and
   (c) exclusive OR processing means for carrying out an exclusive OR operation between the data of one of the two lines and the other of the two lines read by said reading means to detect second directional endpoint positions of the original image data without decoding the input image data into the original image data.

2. The image processing apparatus as claimed in claim 1, wherein the first direction is perpendicular to the second direction.

3. The image processing apparatus as claimed in claim 2, further comprising:
   second directional processing means for carrying out a predetermined image process for the second direction according to the second directional endpoint positions detected by said exclusive OR processing means.

4. The image processing apparatus as claimed in claim 3, wherein the first direction is horizontal and the second direction is vertical.

5. The image processing apparatus as claimed in claim 2, wherein said exclusive OR processing means comprises:
   endpoint position detecting means for detecting first directional endpoint positions of each of the inputted two lines of the original image data; and
   sorting means for extracting different endpoint positions among the first directional endpoint positions of the two lines detected by said endpoint position detecting means and sorting the extracted endpoint positions to output the sorted endpoint positions as second directional endpoint positions.

6. The image processing apparatus as claimed in claim 4, wherein said second directional processing means comprises a vertical run processing circuit for carrying out a run length coding for the second direction of the original image data.

7. The image processing apparatus as claimed in claim 4, wherein said second directional processing means comprises a vertical projection detecting circuit for obtaining projections by projecting the original image data in the second direction.

8. The image processing apparatus as claimed in claim 4, wherein said second directional processing means comprises a vertical component extracting circuit for extracting second directional components of the original image data.

9. An image processing method for carrying out a run length coding in a first direction on original image data to obtain input image data and carrying out an image process in a second direction on the obtained input image data, comprising the steps of:
   (a) coding the original image data with run length codes in the first direction to obtain input image data;
   (b) storing the input image data in memory means;

(c) sequentially reading, from the memory means, data of every two lines which are adjacent to each other in the second direction perpendicular to the first direction; and (d) carrying out an exclusive OR operation on the read data of the every two lines, to detect second directional endpoint positions of the original image data without decoding the input image data into the original image data.

10. The image processing method as claimed in claim 9, further comprising the step of:

(e) carrying out a predetermined image process in the second direction according to the detected second directional endpoint positions.

11. The image processing method as claimed in claim 10, wherein the first direction is horizontal and the second direction is vertical.

12. The image processing method as claimed in claim 10, wherein said endpoint detecting process in said step (d) comprises the steps of:

detecting first directional endpoint positions of each of the inputted two lines of the original image data; and extracting different endpoint positions among the first directional endpoint positions of the detected two lines and sorting the extracted endpoint positions to output the sorted endpoint positions as second directional endpoint positions.

13. The image processing method as claimed in claim 10, wherein said predetermined image process in said step (e) is a process of carrying out a run length coding for the second direction of the original image data.

14. The image processing method as claimed in claim 10, wherein said predetermined image process in said step (e) is a process of obtaining projections by projecting the original image data in the second direction.

15. The image processing method as claimed in claim 10, wherein said predetermined image process in said step (e) is a process of extracting second directional components out of the original image data.

* * * * *